J. T. LYNCH & G. E. BOLTON.
COMBINED PICK-UP TABLE AND CANCELING MACHINE.
APPLICATION FILED FEB. 20, 1911.
1,054,223.
Patented Feb. 25, 1913.
7 SHEETS—SHEET 1.
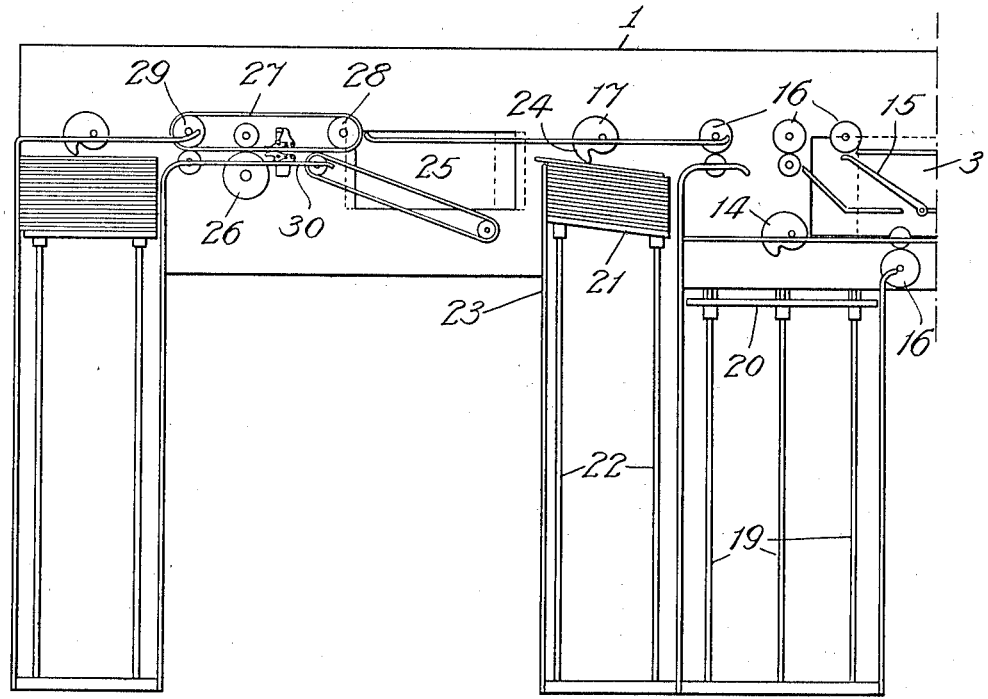
Fig. 1.
Fig. 1.ᵃ
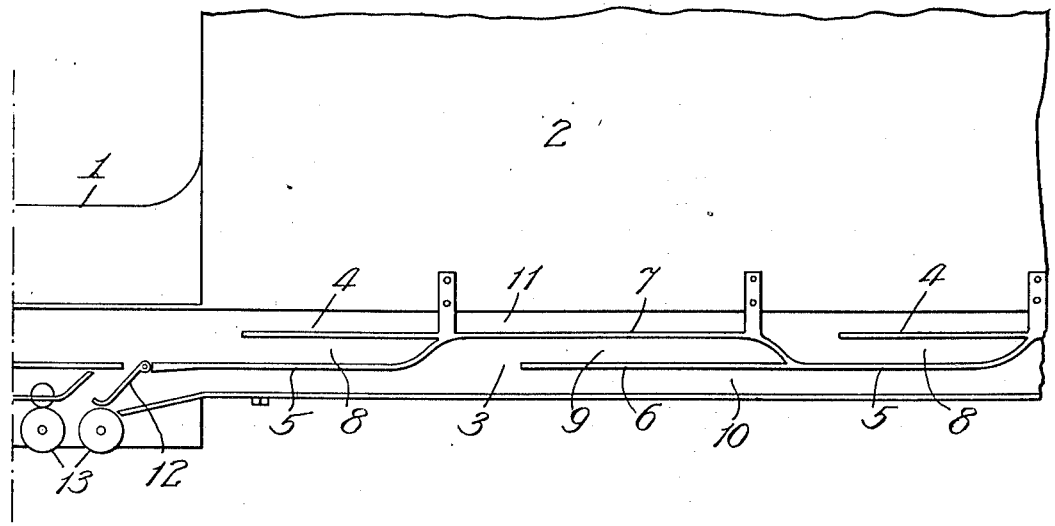
Witnesses:
Inventors
John T. Lynch.
George E. Bolton.
By David H. Fletcher,
Atty.

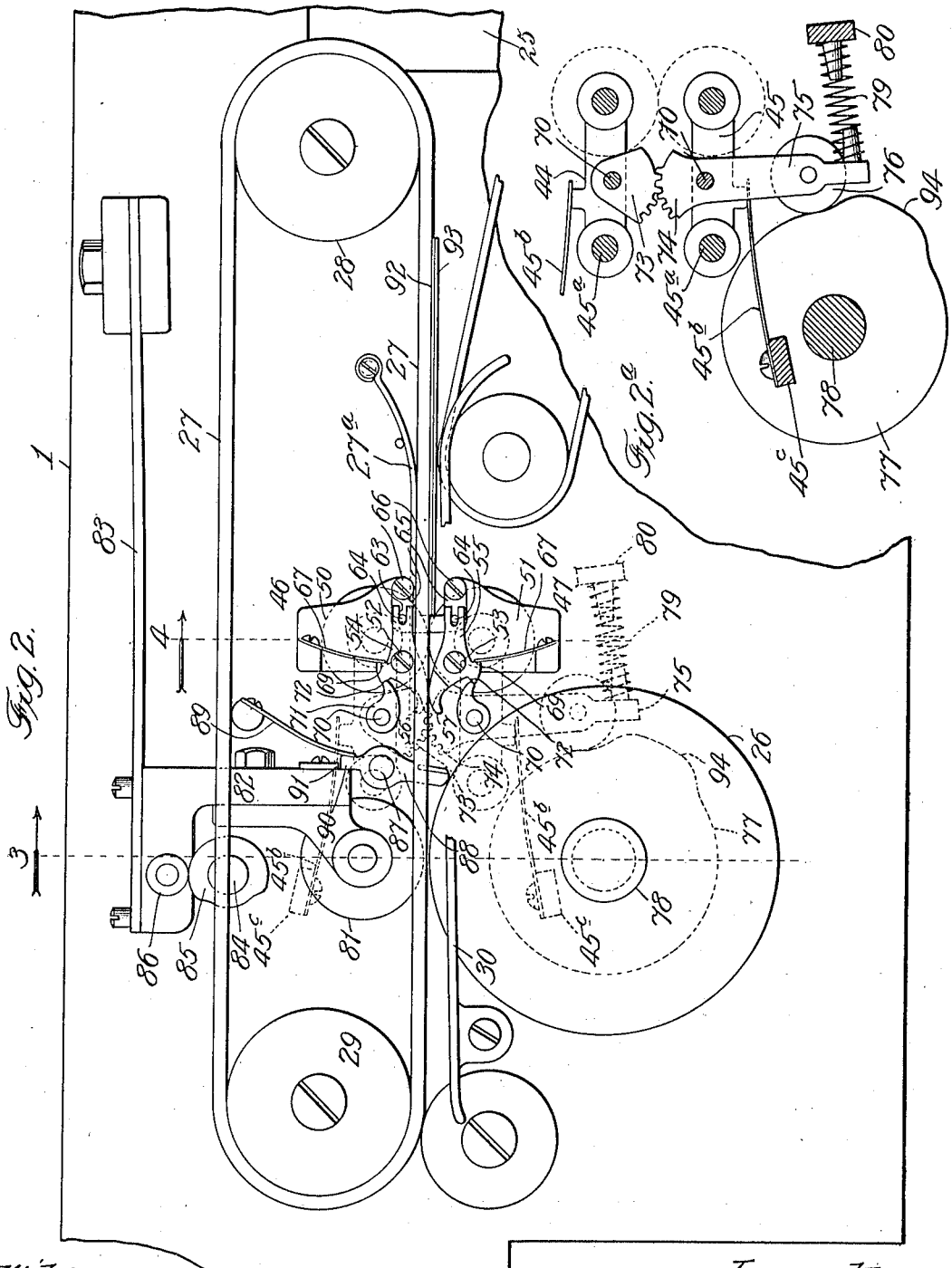

J. T. LYNCH & G. E. BOLTON.
COMBINED PICK-UP TABLE AND CANCELING MACHINE.
APPLICATION FILED FEB. 20, 1911.
1,054,223.
Patented Feb. 25, 1913.
7 SHEETS—SHEET 3.
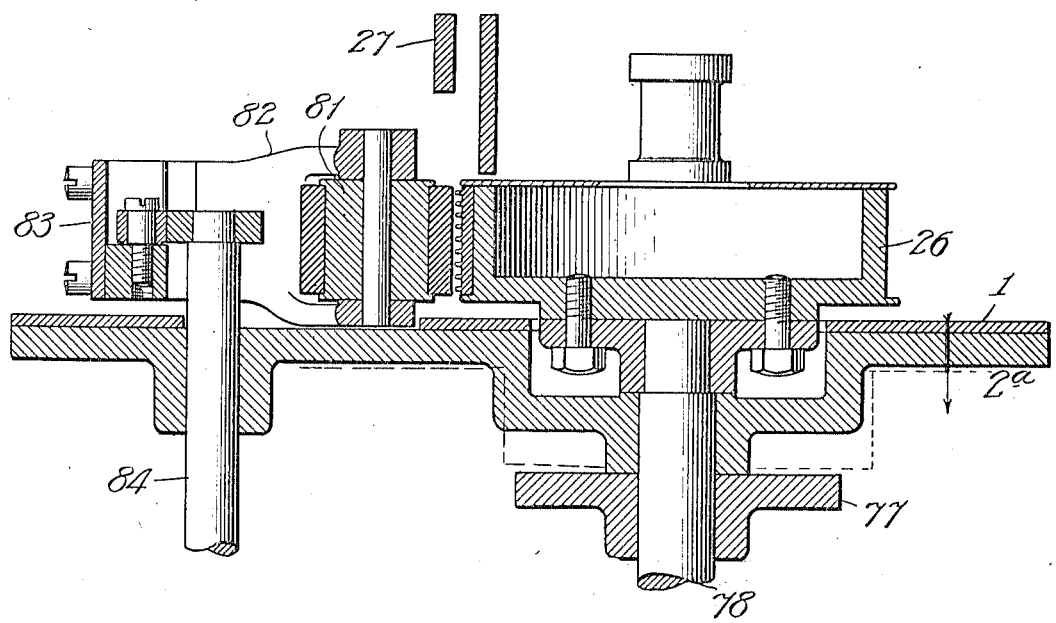
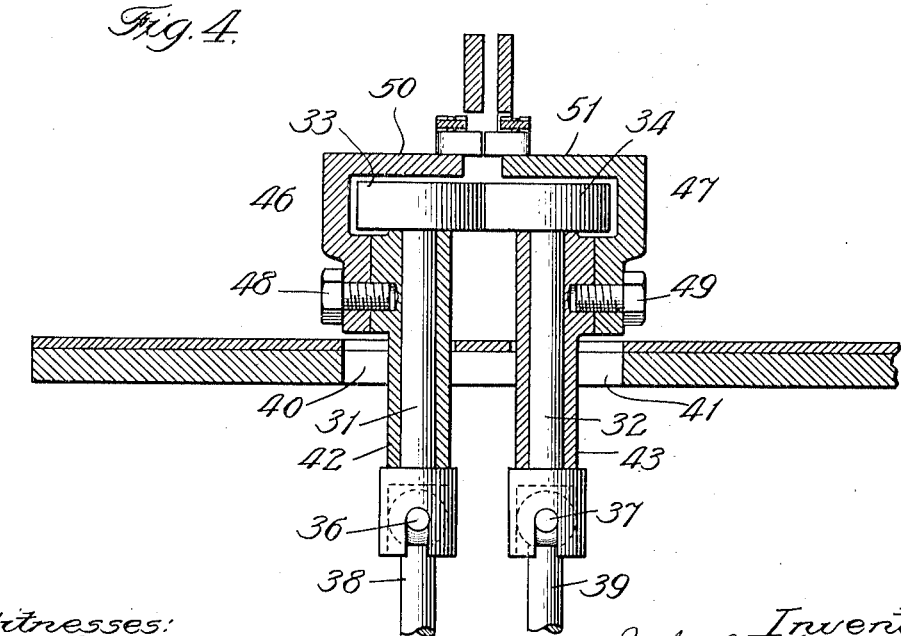
Witnesses:
Geo. E. Gaylord
Chas. H. Buell
Inventors
John T. Lynch
George E. Bolton
By David H. Fletcher
Atty.

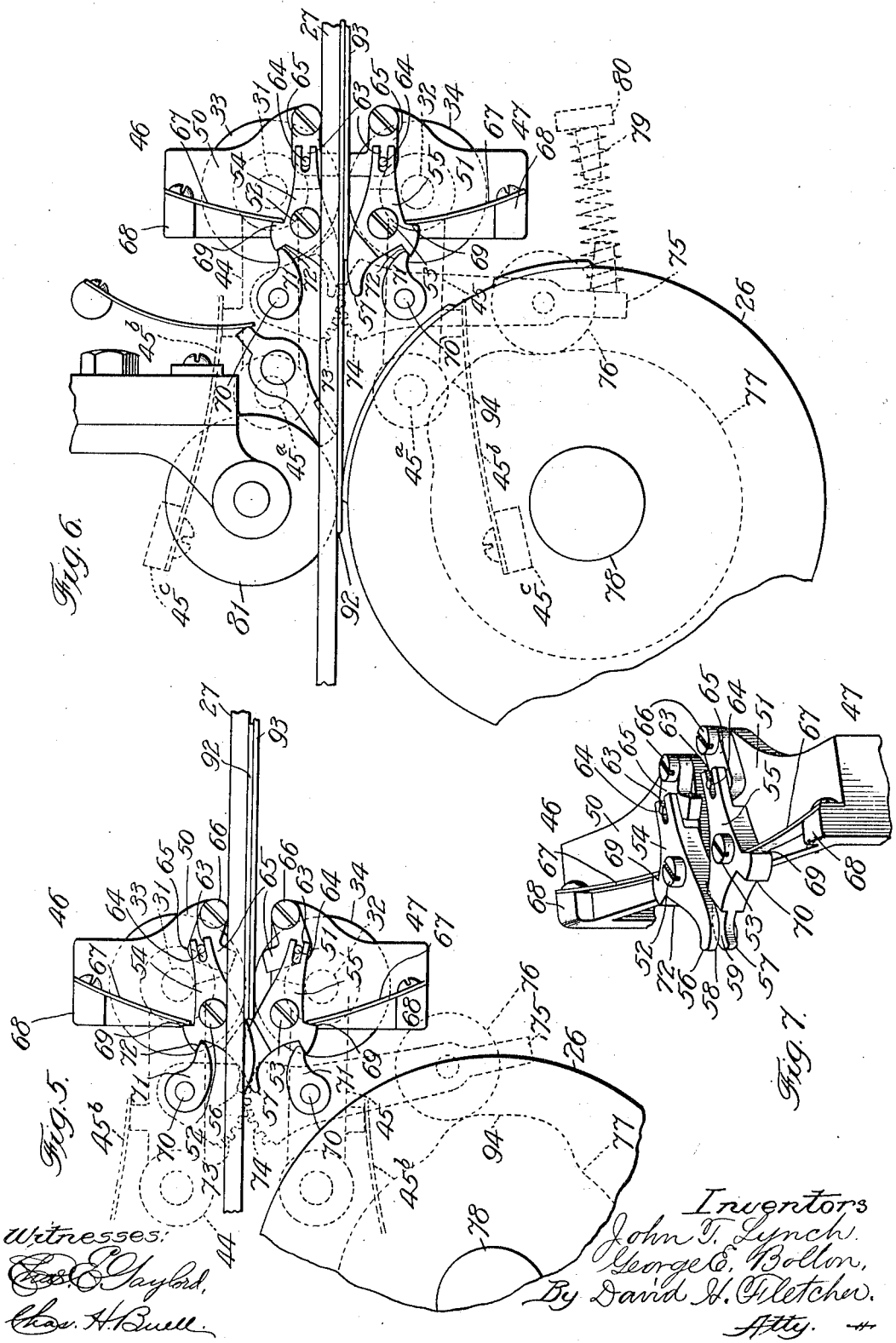

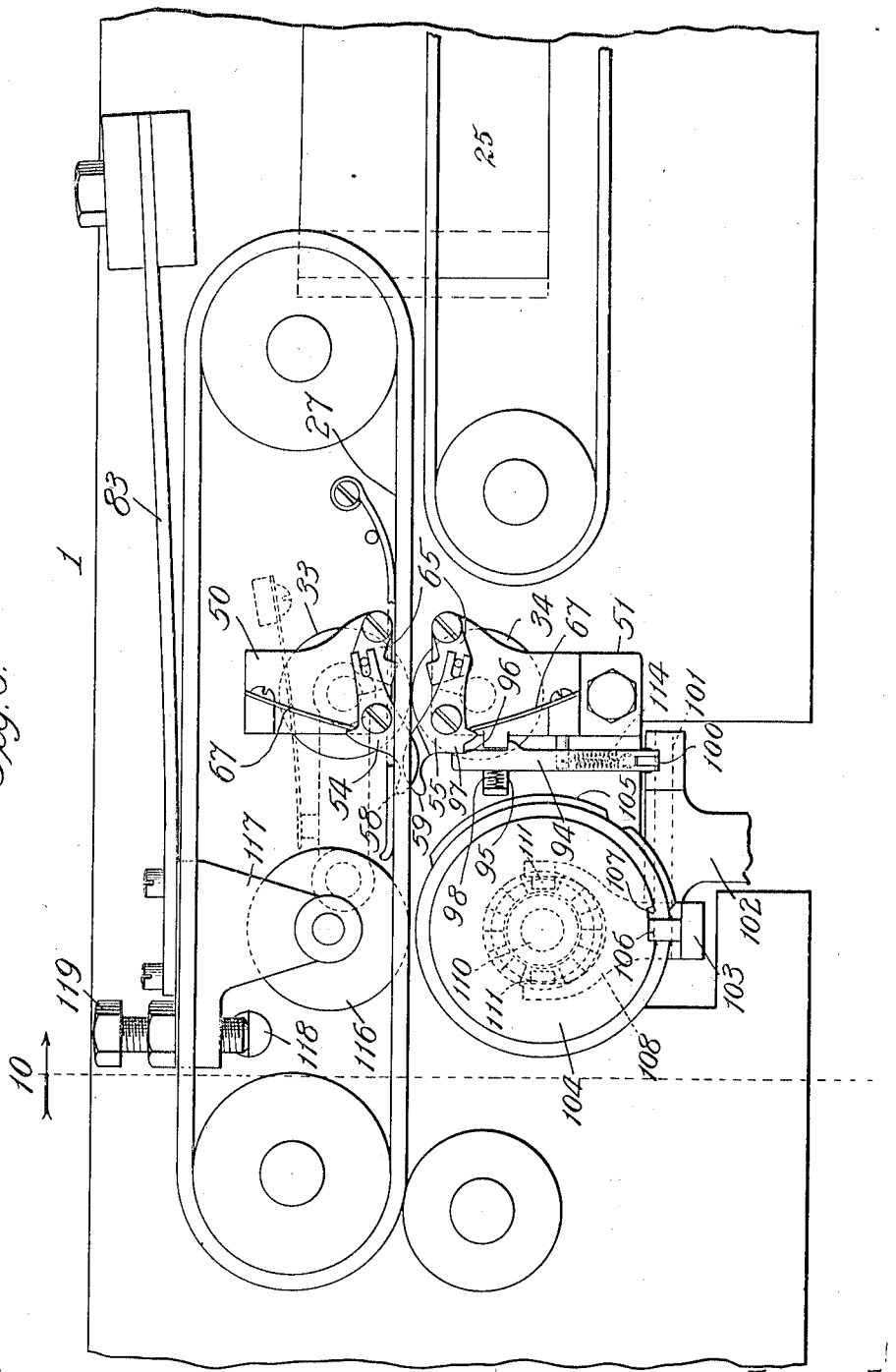

J. T. LYNCH & G. E. BOLTON.
COMBINED PICK-UP TABLE AND CANCELING MACHINE.
APPLICATION FILED FEB. 20, 1911.

1,054,223.

Patented Feb. 25, 1913.

7 SHEETS—SHEET 6.

Witnesses:

Inventors
John T. Lynch,
George E. Bolton,
By David H. Fletcher,
Atty.

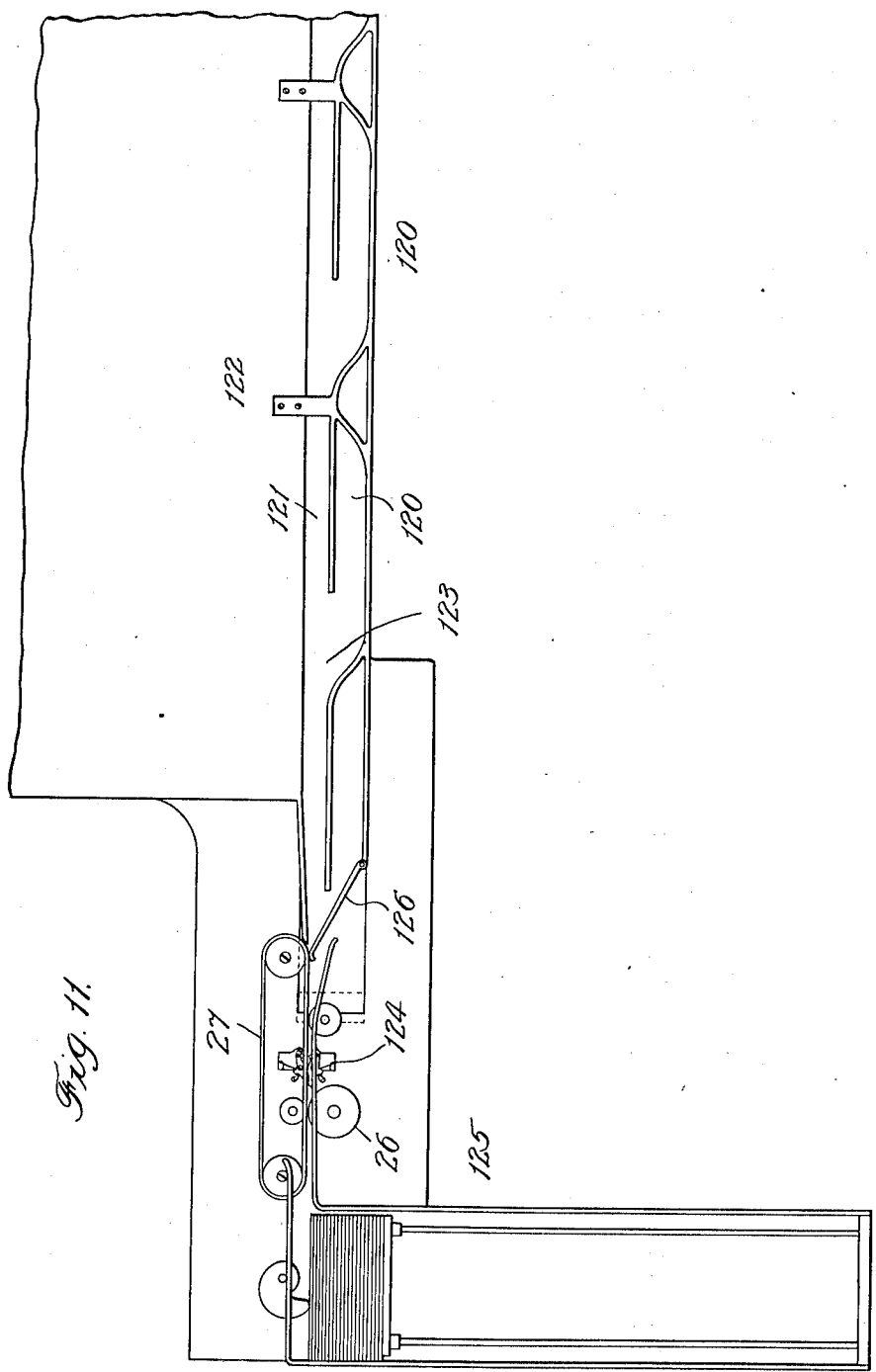

UNITED STATES PATENT OFFICE.

JOHN T. LYNCH AND GEORGE E. BOLTON, OF CHICAGO, ILLINOIS, ASSIGNORS TO THE B. F. CUMMINS COMPANY, A CORPORATION OF ILLINOIS.

COMBINED PICK-UP TABLE AND CANCELING-MACHINE.

1,054,223.  Specification of Letters Patent.  Patented Feb. 25, 1913.

Application filed February 20, 1911. Serial No. 609,726.

*To all whom it may concern:*

Be it known that we, JOHN T. LYNCH and GEORGE E. BOLTON, citizens of the United States, residing at Chicago, in the county of Cook and State of Illinois, have invented certain new and useful Improvements in Combined Pick-Up Tables and Canceling-Machines, of which the following is a description, reference being had to the accompanying drawings, forming a part of this specification, in which corresponding numerals of reference in the different figures indicate like parts.

The primary object of our invention is to so construct and combine a "facing" or pick-up-table and canceling machine for mail matter as to enable mail-pieces to be canceled and stacked ready for distribution in one continuous operation as they come from the hands of the "facing" operatives.

A further object is to provide novel and effective means for producing accurate registration between the mail-pieces as they are advanced from the facing table and any kind of marking die that it may be found desirable to use therewith: as well as for withholding a given mail-piece where two are advanced together, so that they may be spaced from each other and required to pass the marking die in successive order. All of which is hereinafter more particularly described and definitely pointed out in the claims.

Figure 9:
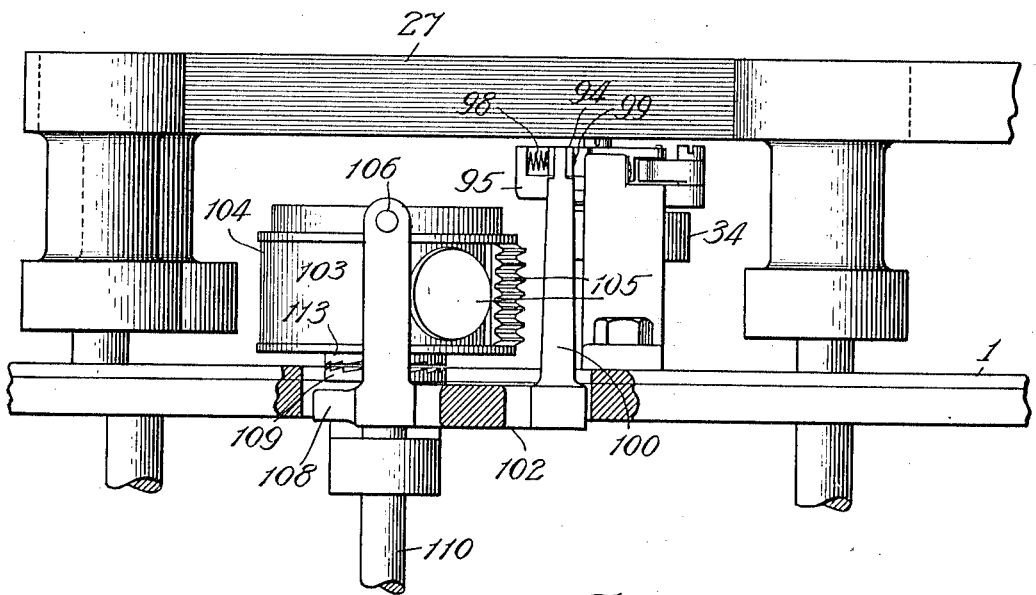
Figure 10:
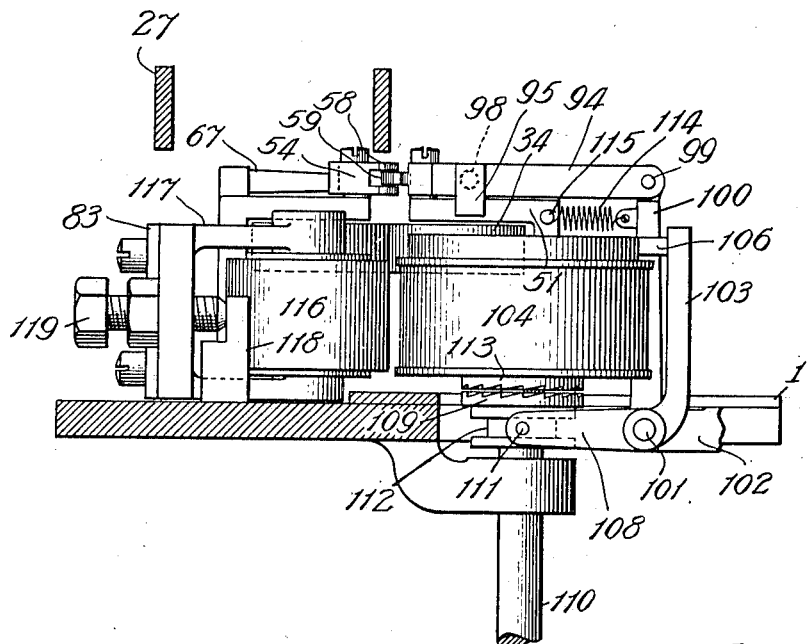

In the drawings, Figure 1, is a plan view of a portion of a machine embodying features of our invention including feeding, intermediate stacking, registering, spacing, marking and final stacking mechanism. Fig. 1ª, is a plan view, showing a continuation of Fig. 1 to include a portion of a pick-up-table, Fig. 2, is an enlarged plan view of a portion of the machine showing the spacing and registering mechanism as the same would be constructed when applied to a continuously rotating die, Fig. 2ª—, Fig. 3, Fig. 3, is a vertical sectional view taken upon the line 3—, Fig. 2, viewed in the direction of the arrow there shown, said view being intended to represent only what would appear upon said section line. Fig. 4, is a like sectional view taken upon the line 4—, Fig. 2, Fig. 5, is a plan view of the spacing and registering mechanism showing the parts in relatively different positions, Fig. 6, is a plan view showing the parts in the respective positions which they would occupy when the mail-pieces are spaced and one is in registering contact with the marking die, Fig. 7, is an isometric view of the timing and spacing elements as they would appear when the parts are in their respective normal positions, Fig. 8, is a plan view of a modified construction showing the spacing and registering mechanism in conjunction with a die normally at rest and means adapted to be controlled by a mail piece for initiating the movement of the die and bringing it into a printing position. Fig. 9, is a front elevation thereof, Fig. 10, is a vertical sectional view taken upon the line 10—, Fig. 8, viewed in the direction of the arrow there shown, and Fig. 11, is a diagrammatic view in plan of a modified construction, showing a portion of a pick-up-table, spacing and timing mechanism, a printing die and a final stacking device.

Inasmuch as the number of mail-pieces which may be canceled in a given time is dependent upon the speed of the die and in view of the fact that satisfactory work cannot be done thereby when driven beyond a given speed, it follows that the capacity of the pick-up-table must either be limited to the highest speed of the die at which satisfactory work may be done or else means should be provided for taking care of the surplus matter when the table operatives are working at full capacity. We prefer the latter alternative and have accordingly shown in Fig. 1, what we regard as a preferable construction.

Referring to the drawings, 1 indicates a table forming an end extension of a well known form of pick-up-table 2, the surface of which latter is at a higher level than that of said extension. Extending along the front edge of the table 2, is the usual horizontal conveyer-belt 3, supported upon drums, above which is located the usual vertical walls or dividing members 4 and 5 and 6 and 7, forming pockets 8 and 9 respectively for the reception of small and large mail-pieces,—the former leading to a runway 11 and the latter to a runway 10. The usual spring pressed finger 12, is jointedly connected to the partition between the small and large mail-pieces, which acts in conjunction with feed rolls 13, to separate and advance the large mail-pieces to a well known form of eccentric stacker-wing 14, Fig. 1, while a similar finger 15, and feed-rollers 16, act in like manner upon the small mail-pieces to convey them to a like stacking wing 17. The intermediate stacking frame 18, for large mail pieces, is provided with the usual inclined rods 19 upon which is mounted a sliding follower 20 adapted to be yieldingly held against the mail pieces by the usual spring or weight and cord, not shown, while a like follower 21, is mounted in a similar manner upon the rods 22 of the frame 19, for the small mail-pieces. A shield or abutment 23, Fig. 1, is located in advance of the stacker wing 17 in position to stop such of the mail-pieces as may be pressed against the follower by the wing but leaving sufficient space in the pathway to permit the foremost mail-piece to pass. The mail-pieces are successively advanced by the contact of the arm 24, which serves to move the foremost piece as indicated, while the others are pressed back against the follower 21, with their forward ends abutting against the stop 23, and are prevented from being advanced. When the arm 24 is in the position shown in Fig. 1, any succeeding mail-pieces which may be sufficiently advanced, will be projected into the throat or space between the foremost mail-piece already in contact with the arm and the hub of the stacker. Upon the next revolution, the first tendency of the arm will be to press these back against the follower, but as the arm continues to rotate, the foremost piece will be advanced by frictional action while the others will remain behind. A conveyer belt 25, mounted in a well known way upon horizontal drums, not shown, serves to advance the mail pieces from the stacker-wing 17 toward a marking die 26. A feed-belt 27, mounted upon pulleys 28, 29, is extended past, with its lower edge in a plane above the top of the marking die. A stationary shield 30, is arranged substantially parallel to the feed-belt 27 adjacent to the letter path. Immediately preceding the printing die and as near thereto as may be, is located our improved spacing and registering mechanism, which will now be described.

It is well known that the ordinary separating mechanism frequently fails in its work when mail-pieces are thin or flimsy or damp and that in such cases two pieces may be carried past the die at once, only one of which will be marked. Our improvements enable us to overcome this difficulty and to insure the marking of all the pieces.

Mounted upon shafts 31 and 32 respectively, shown in full lines in Fig. 4 and indicated in dotted lines in Figs. 5 and 6, which shafts are driven in opposite directions, are supplemental feed rolls 33, 34. Said shafts are connected by means of the usual jointed connections 36, 37, Fig. 4, to shafts 38, 39, to permit the feed rolls to yield laterally when mail-pieces are passed between them. Slots 40, 41, are formed in the table to provide for this movement. Mounted upon the shafts 31, 32 are sleeves 42, 43, in which said shafts are rotated. Arms 44, 45, shown in full lines in Fig. 2$^a$ and in dotted lines in Figs. 2, 5 and 6, are cast upon or rigidly attached to the sleeves 42, 43, and are pivoted beneath the frame to studs 45$^a$ depending from the frame. Springs 45$^b$, attached to lugs 45$^c$, are located as shown and arranged to act in opposite directions against said arms to press the feed rollers toward each other. Hoods or fittings, generally designated by 46, 47, are rigidly attached to said sleeves by means of screws 48, 49. Said fittings are provided with flat horizontal plates 50, 51, adapted to overhang and partially cover the feed rollers.

Pivotally mounted upon the plates at 52, 53, are lever elements or trip-fingers generally designated by 54, 55, which are provided with forwardly extended and oppositely curved fingers 56, 57, which are arranged to interlock with or cross each other as clearly shown in Figs. 5 and 7. In order to permit this overlapping or interlocking action, we prefer to slot the member 56, horizontally, as shown at 58, and to cut away the forward portion of the member 57 as shown at 59, Fig. 7, so as to freely enter said slot. The fittings 50, and 51 being mounted upon the sleeves 42 and 43, are caused to move laterally with the shafts upon which said sleeves are mounted, and are maintained in proper relation to each other by means of the arms 44 and 45. The rear ends of the trip fingers are slotted as shown at 63 and are in loose engagement with pins 64, upon the forward ends of jaws 65, which are bent or elbow-shaped as shown and arranged so that their ends are free to be pressed against each other when in normal position as clearly shown in Fig. 2. Springs 67, attached to lugs 68, are adapted to press against shoulders 69 upon said trip-fingers for the purpose of moving the rear ends laterally to cause a separation of said jaws at the proper time for the purpose hereinafter stated.

It should be here noted that the meeting faces of the last feed rollers, the point of intersection of the trip-fingers and the meeting ends of the spacing jaws are all in the same vertical plane which coincides with the working face of the feed belt 27, so that when a mail-piece is passing, one face thereof will be pressed against said feed belt and if more than one piece is present the friction of the one piece against the belt will be increased. We prefer to employ a backing spring 27$^a$, Fig. 2, in conjunction with the feed belt to supplement the action described. The purpose and effect of this adjustment will be more clearly understood in describing the operation of the spacing elements.

Inasmuch as the mechanism so far described is intended to be utilized both for spacing and registering the mail-pieces, it is essential that means should be provided for causing the same to co-act with the printing die whether the latter be continuously rotated or normally at rest. In the one case, the timing of the mail-piece should be controlled from the die shaft and in the other the mail-piece, acting through the agency of the spacing mechanism, should serve to initiate the movement of the die. The first named mechanism will now be described. Rigidly attached to the upper ends of short shafts or pins 70, 70, are pawls 71, 71, which are adapted to engage shoulders 72, 72, upon the trip-fingers 54, 55, to control the relative positions of said fingers as hereinafter stated against the action of the springs 67. The shafts 70 are journaled in bearings in the table through which they are extended. Segmental gears 73, 74, Fig. 2ª, located beneath the table, are rigidly attached to the lower ends of the shafts 70 and are arranged to intermesh with each other. An arm 75, is formed upon the gear 74 and extended in an opposite direction therefrom, said arm having a friction roller 76, journaled upon a wrist-pin thereon and in position to engage a cam 77, upon the die shaft 78, shown in Figs. 2ª and 3 and indicated in dotted lines in Figs. 2, 5 and 6. A coiled spring 79, is interposed between a lug 80 and the end of the arm 75 to press the roller 76 against the cam. The jaws 65, constitute a letter timing mechanism adapted to be controlled by the movement of the die. It is essential however, in this form of mechanism, that means should be provided for normally holding the impression-roll away from the die except during the passage of a mail-piece and to release it when one is presented. Inasmuch as the mechanism shown, upon which of itself we make no claim, constitutes a modification of one heretofore employed for a like purpose a brief description thereof will suffice. An impression roll or platen 81, Figs. 2 and 3, is mounted in a yoke 82, attached to the end of a spring 83, which tends to press the roller against the die. A shaft 84, geared to rotate in harmony with the printing die, is provided with a cam 85 upon the upper end which is in engagement with a friction roller 86 upon the yoke 82. The high part of the cam is so adjusted as to hold the impression roller away from the printing head at all times, except during the passage of a mail-piece; but, in the absence of special means to prevent it, the impression roller would, in the absence of a mail-piece, be permitted to contact with the die when the roller 86 rides upon the low part of the cam. This action is prevented by means of a letter actuated trip. Loosely mounted upon a stud 87 is a trip finger 88, which is held normally in the letter-path by means of a spring 89, arranged to press against a lug 90, upon said trip to hold said lug against the body of the yoke which serves as a stop therefor. A shoulder 91, of hardened steel, is removably secured to said yoke to form an abutment for the lug 90, and when the two are in engagement as shown, they serve to hold the impression roller out of contact with the die regardless of the action of the cam 85. When, however a mail-piece is brought into contact with the trip-finger, the latter is tilted thereby, and the lug 90 released from contact with the shoulder 91. This leaves the impression roller free to press the mail-piece against the die when the low part of the cam 85 is presented to the roller 86. When the trip finger is released from contact with the passing mail-piece it is restored to its normal position by the action of the spring 89, which occurs while the roller 86 is still upon the high part of the cam so that the parts 90 and 91 will again be in engagement to hold the impression roller in its normal position until released by another mail-piece.

The operation of the timing and spacing mechanism is as follows: The spring 79, Figs. 2 and 2ª acts to press the roller 76 against the cam 77. The pawls 71 are so adjusted with reference to the segmental gears 73, 74, as to hold the trip-fingers 54, 55 in the respective positions shown in Fig. 2, when the roller 76 is upon the lower part of the cam, thereby causing the ends of the jaws 65 to abut against each other and thus form a stop across the letter path. As the mail-pieces are advanced by the feed-mechanism they are arrested by said jaws as shown at 92, 93, Fig. 2. As soon, however, as the roller 76 rides upon the high position 94, of the cam, the segmental gears are actuated to cause the ends of the pawls 71 to move toward each other and thereby permit the trip fingers to be moved by the springs 67 into the interlocking relation shown in Fig. 5, thereby opening the jaws 65 and permitting the mail-pieces 92, 93 to be advanced to the position shown in said last named figures. The tension of the spring 67 is such as to permit the forward ends of the trip fingers to be separated as a result of the wedging action of the mail-pieces which pass between them as indicated in Fig. 6. This separating action of the forward ends of the fingers causes the rear ends to be moved toward each other and, with them the jaws 65, which press against the outer faces of the two mail-pieces. Inasmuch, however, as the lateral adjustment of the jaws with respect to the belt 27 is such as to bring the working face of the belt in alinement with the line of contact of the jaws when brought together, it follows that a single mail-piece when passing will be pressed against the belt and if there be more than one, the pressure will be proportionately increased, so that the frictional contact between the belt and the piece next to it will be greatly in excess of that between the two mail-pieces. The pressure of one of the trip-fingers and one of the jaws upon the side of the second mail-piece will serve to hold it back.

While the device described serves to space the mail-pieces when the latter are advanced together and thus to insure the marking thereof in successive order, it does not interfere with the movement of mail-pieces when advanced singly, but merely causes them to be properly timed. In other words it acts at all times as a timing device and as a spacing device when needed.

In Figs. 8 to 10 inclusive, we have shown a modification of the timing and spacing features of the invention by which they may be applied to a printing die normally at rest. In such case the several features of the spacing mechanism already described remain the same except that the shoulders 72 upon the trip-fingers are dispensed with, thereby permitting the forward ends of said fingers to remain normally interlocked while the jaws 65 are separated. The same reference numerals are therefore retained upon the unchanged parts. A bar 94 is arranged with one end loosely supported upon a horizontal arm 95. A shoulder 96, Fig. 8, near the free end of said bar, is adapted to engage a shoulder 97 upon the trip-finger 55. A spring 98 acts to press said bar laterally against the trip-finger. The other end of said bar is jointly connected at 99 to the upper end of an arm 100, which latter is rigidly attached at its lower end to a rock-shaft 101, journaled in a suitable bearing in a part 102 beneath the table. An elbow-lever is also rigidly attached to said shaft, said lever having an arm 103, which is extended upwardly adjacent to a cylindrical printing head 104, having the usual printing die 105 upon its periphery. An inwardly projecting pin 106, is adapted to enter a notch 107 in the printing head to normally hold the latter against movement. The other portion 108 of the elbow-lever is bifurcated to form a yoke the arms of which straddle a clutch member 109 which is splined to the die-shaft 110, so as to be rotated thereby while free to be moved vertically thereon. Pins 111 in the yoke arms are adapted to engage a groove 112 in said clutch member for manipulating it. The die-head 104, is loosely mounted upon the shaft 110 and is provided with a clutch-member 113, adapted to be engaged by the member 109. The arm 100 is connected by means of a spring 114 to a pin 115 upon the plate or member 51. An impression roller 116 is journaled in a yoke 117 attached to the end of the spring 83 which tends to press it toward the die, the movement being limited by a stop 118 and set-screw 119. The die 105 is sufficiently extended to cause the mail-piece against which it is pressed to contact with the impression roller.

The operation of the spacing mechanism in connection with the normally stationary die, is as follows: When a mail-piece is advanced into contact with the trip-fingers, the forward ends of the latter are separated thereby, which action causes the bar 94 to be pushed back against the action of the spring 114. This, in turn, tilts the arm 100, rocks the shaft 101, actuates the elbow lever, withdraws the locking-pin 106, and lifts the clutch-member 109 into engagement with its counterpart 113. The die is thereupon caused to make one revolution to mark the mail-piece, and the latter having passed the trip fingers, said fingers are restored to their respective normal positions by the springs 67. This in turn permits the arm 100 to be drawn back by the recoil of the spring 114, which reverses the movement of the elbow lever to disconnect the clutch members and lock the die head in a normal position through the movement of the pin 106. The action of the jaws 65, serves to space the mail-pieces, should two be presented at once, in the manner hereinbefore described.

In Fig. 11, is shown a modification illustrating the spacing or registering mechanism combined with a pick-up-table, a canceling die and stacking mechanism. In this example pockets 120 for small mail-pieces only, leading to a main letter channel 121 along the edge of the pick-up-table 122, are shown, while the conveyer belt 123 is extended beneath the feed belt 27 so that the mail-pieces will be conveyed from the pick-up-table directly to the spacing or registering mechanism generally designated by 124, thence to the die 26, and to the final stacking mechanism generally indicated by 125. In this construction the usual diagonally placed yielding shield 126 is preferably employed as it tends to partially separate and control the movement of the mail-pieces which are frequently deposited in bunches in the pockets. Such a construction is entirely practicable in cases where the capacity of the pick-up-table is limited to conform to that of the marking die; otherwise the use of an intermediate stacking mechanism is preferred.

Having thus described our invention, we claim:

1. In a device of the class described, the combination of a pick-up-table, a series of feed-pockets for receiving mail-pieces, a runway, a conveyer in said runway leading to separating mechanism, feeding mechanism for advancing the mail pieces to a marking die, means for timing the mail-pieces to act in harmony with said die and means for preventing an excess of mail-pieces beyond a given maximum from being advanced to said timing means.

2. In a device of the class described, the combination of a series of feed-pockets arranged to communicate with a runway, means common to both said feed-pockets and runway for conveying articles from said pockets toward a marking die, a marking die, means for feeding mail pieces thereto and means acting in harmony with the movement of the die, for yieldingly pressing upon opposite sides of the mail-pieces and at the same time pressing one side of one mail-piece laterally against said feeding means.

3. The combination of a pick-up-table, a series of feed pockets, a runway, a conveyer located beneath said pockets and runway, to receive and convey the mail-pieces toward a rotary marking couple, a marking couple comprising a die and impression roller, a feed-belt located in a vertical plane, adjacent to the mail-piece path, a timing mechanism interposed in said path immediately behind the marking couple, means for causing the same to be actuated in harmony with the movement of the die, and gripping means for pressing one mail-piece against another and the latter against said feed-belt to retard the former while the latter is advanced to the die.

4. The combination of a pick-up-table, a series of feed pockets for the reception of mail-pieces, said pockets being in communication with a common runway, a runway, a conveyer for advancing the mail-pieces thereon, a marking die, feed mechanism for advancing the mail-piece from said conveyer to said die, yielding trip fingers behind said die held normally in the letter path from opposite sides thereof, laterally movable gripping members located upon opposite sides of the letter path, means for causing the same to move toward each other to press against a mail-piece when said trip-fingers are separated by a mail-piece and means for causing the movement of said trip-fingers to harmonize with that of said printing die.

5. The combination of a pick-up-table, a series of feed-pockets for the reception of mail-pieces, said pockets being in communication with a common runway, a runway, a conveyer for advancing the mail-pieces therein, a marking die, feed mechanism for advancing the mail-piece from said conveyer to said die, yielding spring controlled trip-fingers, immediately preceding said die, said fingers being held normally in the letter-path from opposite sides thereof, laterally movable opposing gripping members located upon opposite sides of said path, means for causing the same to move toward each other to press against a mail-piece when said trip-fingers are separated by a mail-piece, means for causing the movement of said trip-fingers to harmonize with that of said printing die and feeding means for exerting a frictional action upon the mail-piece in contact therewith.

6. The combination of a pick-up-table, a series of feed-pockets for the reception of mail-pieces, said pockets being in communication with a common runway, a runway, a conveyer for advancing the mail-pieces therein, a marking die, feed mechanism for advancing the mail-pieces from said conveyer to said die, yielding spring-controlled trip-fingers immediately preceding said die, said fingers being held normally in the letter-path from opposite sides thereof, laterally movable opposing gripping members located upon opposite sides of said path, means for causing said members to move toward each other to press against a mail-piece when said fingers are actuated thereby, a cam mounted upon the die shaft and means actuated thereby for holding said trip-fingers in a predetermined position when the die is in a non-printing position and for releasing the same when said die is in a printing position.

7. The combination of a pick-up-table, a series of feed-pockets for the reception of mail-pieces, said pockets being in communication with a common runway, a runway, a conveyer for advancing the mail-pieces therein, a marking die, feed mechanism for advancing the mail-pieces from said conveyer to said die, yielding spring-pressed trip-fingers immediately preceding said die, said fingers being held normally in the letter-path from opposite sides thereof, laterally movable opposing gripping members located upon opposite sides of said path, means for causing said members to move toward each other to press against a mail-piece when said fingers are actuated thereby, a cam mounted upon the die-shaft and means controlled thereby for holding said gripping members across the letter-path when the die is in a non-printing position and for separating the same when the die approaches a printing position.

8. The combination of a pick-up-table, a series of feed pockets for receiving mail-pieces, a runway, a conveyer, a marking die, feeding mechanism for advancing the mail-pieces to said die, a spacing mechanism immediately preceding the marking die, means for causing said spacing mechanism to act in harmony with the movement of the die and interposed stacking mechanism located between said pick-up-table and spacing mechanism.

9. The combination of a pick-up-table, a series of feed pockets for receiving mail-pieces, a runway, a conveyer, a marking die, feeding mechanism for advancing the mail-pieces to said die, a spacing mechanism for retarding the presentation to the die of all but a single mail-piece and tripping means actuated by the passing mail-pieces for bringing said spacing mechanism into action.

10. The combination of a pick-up-table, a series of feed pockets for receiving mail-pieces, a runway, a conveyer in said runway, a marking die, feeding mechanism for advancing the mail-pieces to said die, a combined timing and spacing mechanism for timing the advance of the mail-pieces to the die, means for causing said timing mechanism to act in harmony with the movement of the die, and a trip finger controlled by the movement of a mail-piece for bringing said spacing mechanism into action to retard the movement of all but a single mail-piece pending the marking of said mail-piece.

11. The combination of a pick-up-table, a series of feed pockets for receiving mail-pieces, a runway, a conveyer in said runway, a marking die, feeding mechanism for advancing the mail-pieces to said die, a combined timing and spacing mechanism for timing the advance of mail pieces to the die, the same having opposing members pivotally supported upon opposite sides of the letter-path, means for normally holding said members in yielding contact across said path, means controlled by the movement of the die-shaft for permitting the withdrawal of said members in harmony with the movement of the die, and means controlled by the presence of the mail-pieces between said members for causing said members to press upon opposite sides of passing mail-pieces when the latter are advanced between them.

12. The combination of a pick-up-table, a series of feed pockets for receiving mail-pieces, a runway, a conveyer in said runway, a marking die, feeding mechanism for advancing the mail-pieces to said die, a combined timing and spacing mechanism for timing the advance of mail-pieces to the die, the same having opposing members pivotally supported upon opposite sides of the letter-path means for normally holding the same across said path, means controlled by the movement of the die-shaft for permitting the withdrawal of said members in harmony with the movement of the die, means controlled by the movement of the mail-piece for causing said members to press upon opposite sides of passing mail-pieces as the latter are advanced between them and a supplemental stacking mechanism located between said pick-up-table and said timing and spacing mechanism to hold back mail-pieces when advanced from the pick-up-table at a rate exceeding the speed of the die.

In testimony whereof, we have signed this specification in the presence of two subscribing witnesses, this 18th day of February 1911.

JOHN T. LYNCH.
GEORGE E. BOLTON.

Witnesses:
HARRY I. CROMER,
JENNIE L. FISKE.